(12) United States Patent
Ido et al.

(10) Patent No.: US 8,435,455 B2
(45) Date of Patent: May 7, 2013

(54) HONEYCOMB STRUCTURAL BODY AND EXHAUST GAS CONVERSION APPARATUS

(75) Inventors: Takahiko Ido, Ibi-Gun (JP); Yoshihiro Koga, Ibi-Gun (JP); Takumi Asanuma, Ibi-Gun (JP); Keisuke Tange, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 287 days.

(21) Appl. No.: 13/044,574

(22) Filed: Mar. 10, 2011

(65) Prior Publication Data
US 2011/0250094 A1    Oct. 13, 2011

(30) Foreign Application Priority Data
Apr. 9, 2010  (WO) .................. PCT/JP2010/056477

(51) Int. Cl.
*B01D 50/00*    (2006.01)
(52) U.S. Cl.
USPC ......................................... 422/174; 422/180
(58) Field of Classification Search .................. 422/174, 422/177, 180; 55/523; 324/700, 718; 60/300
See application file for complete search history.

(56) References Cited

U.S. PATENT DOCUMENTS

| 5,569,455 A * | 10/1996 | Fukui et al. ................... 422/174 |
| 5,588,292 A * | 12/1996 | Hiraishi et al. ................. 60/300 |
| 5,733,352 A * | 3/1998 | Ogawa et al. ................... 55/523 |
| 2009/0108856 A1* | 4/2009 | Yonushonis et al. .......... 324/718 |
| 2010/0308849 A1* | 12/2010 | Bouteiller et al. ............ 324/700 |

FOREIGN PATENT DOCUMENTS

| JP | 49-124412 U | 10/1974 |
| JP | 4-44424 U | 4/1992 |
| JP | 7-80226 | 3/1995 |
| JP | 2002-349245 | 12/2002 |

* cited by examiner

*Primary Examiner* — Tom Duong
(74) *Attorney, Agent, or Firm* — Ditthavong Mori & Steiner, P.C.

(57) ABSTRACT

A honeycomb structural body includes a plurality of honeycomb units, first and second electrodes, and first and second conductive members. The plurality of honeycomb units are adhered to each other by interposing an adhesive layer. Each of the plurality of honeycomb units contains a conductive ceramic material. Each of the plurality of honeycomb units includes cell walls extending along a longitudinal direction of each of the plurality of honeycomb units to define a plurality of through-holes. The first and second electrodes are provided on an outer peripheral surface of each of the plurality of honeycomb units. The first and second conductive members are electrically connected to the first and second electrodes, respectively.

66 Claims, 3 Drawing Sheets

HONEYCOMB STRUCTURAL BODY AND EXHAUST GAS CONVERSION APPARATUS

CROSS-REFERENCE TO RELATED APPLICATIONS

The present application claims priority under 35 U.S.C. §119 to International Application No. PCT/JP2010/056477, filed on Apr. 9, 2010. The contents of this application are incorporated herein by reference in their entirety.

BACKGROUND OF THE INVENTION

1. Field of the Invention

The present invention relates to a honeycomb structural body and an exhaust gas conversion apparatus.

2. Discussion of the Background

Exhaust gas of automobiles contain substances such as hydrocarbon compounds, carbon monoxide, and nitrogen oxide. A honeycomb structural body formed of cordierite is used for converting the exhaust gas. The honeycomb structural body includes plural through-holes partitioned by cell walls in which the surface of the cell walls is formed of a catalyst carrying layer formed of alumina. Catalysts such as platinum, rhodium, and palladium are carried on the catalyst carrying layer.

However, in a case where the temperature of the exhaust gas decreases, it becomes difficult for the catalyst carried on the catalyst carrying layer to sufficiently function (activate). This results in a problem of the exhaust converting function of the honeycomb structural body being easily degraded.

In JP-U-49-124412, there is disclosed a catalytic exhaust gas converting apparatus related to an internal combustion engine in which a heating element such as silicon carbide used as the base material of a honeycomb structural body, an integral structure catalyst body formed of a single honeycomb unit is installed in a container for a catalyst support connected to an exhaust gas passage by interposing an insulating member, and an outer peripheral portion of the catalyst body is connected to a terminal. Only in a condition where the catalyst body is in an atmosphere of a predetermined temperature, the catalyst body is heated by heating the base material of the honeycomb unit with a charge from a power source via the terminal on the catalyst body.

JP-P-7-80226 discloses an exhaust gas filter for converting exhaust gas of an internal combustion engine in which the exhaust gas filter in formed of an assembly of plural porous ceramic filters and a pair of self-heating electrodes provided on both ends thereof.

JP-U-49-124412 and JP-P-7-80226 are incorporated herein.

SUMMARY OF THE INVENTION

According to one aspect of the present invention, a honeycomb structural body includes a plurality of honeycomb units, first and second electrodes, and first and second conductive members. The plurality of honeycomb units are adhered to each other by interposing an adhesive layer. Each of the plurality of honeycomb units contains a conductive ceramic material. Each of the plurality of honeycomb units includes cell walls extending along a longitudinal direction of each of the plurality of honeycomb units to define a plurality of through-holes. The first and second electrodes are provided on an outer peripheral surface of each of the plurality of honeycomb units. The first and second conductive members are electrically connected to the first and second electrodes, respectively.

According to another aspect of the present invention, an exhaust gas conversion apparatus includes the above-mentioned honeycomb structural body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Because the conventional exhaust gas filter illustrated in FIG. 6 of JP-P-7-80226 includes a combination of a filter having a substantially quadrate cross section and a filter having a substantially isosceles triangle cross section and has a pair of self-heating electrodes on both ends of each of the filters, it is difficult to uniformly distribute current to the filters. As a result, a portion of the filters may be heated insufficiently and exhaust gas conversion property may be easily degraded.

Further, in a case where power is applied between the self-heating electrodes from a high capacity battery used in, for example, a hybrid automobile via the terminal, problems such as disconnection of the terminal or the self-heating electrodes or generation of heat due to contact resistance between the terminal and the self-heating electrodes may easily occur.

In light of the above, an embodiment of the present invention can obtain a honeycomb structural body capable of uniformly distributing a current to plural honeycomb units and preventing disconnection or generation of heat due to contact resistance electrodes even in a case where power is applied between electrodes from a high capacity battery via a terminal, and an exhaust gas conversion apparatus including the honeycomb structural body.

In the following, embodiments of the present invention are described with reference to the accompanying drawings.

Figure 1:
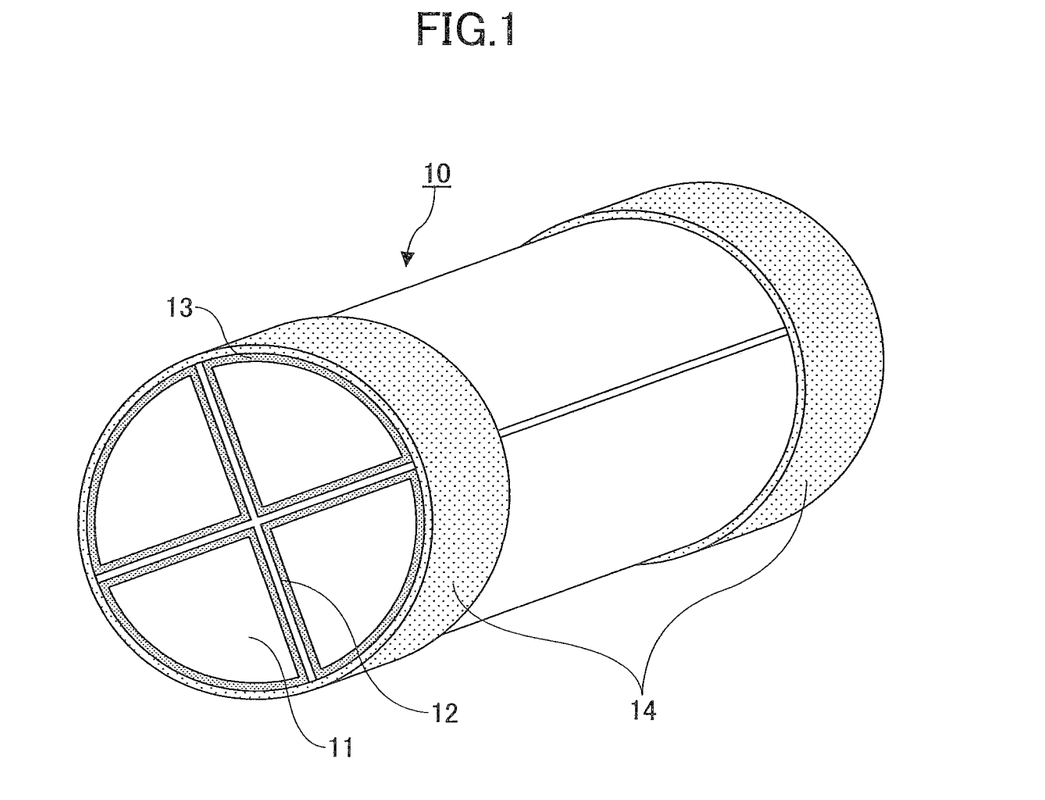
FIG. 1 is a perspective view illustrating an example of a honeycomb structural body of according to an embodiment of the present invention.
Figure 2:
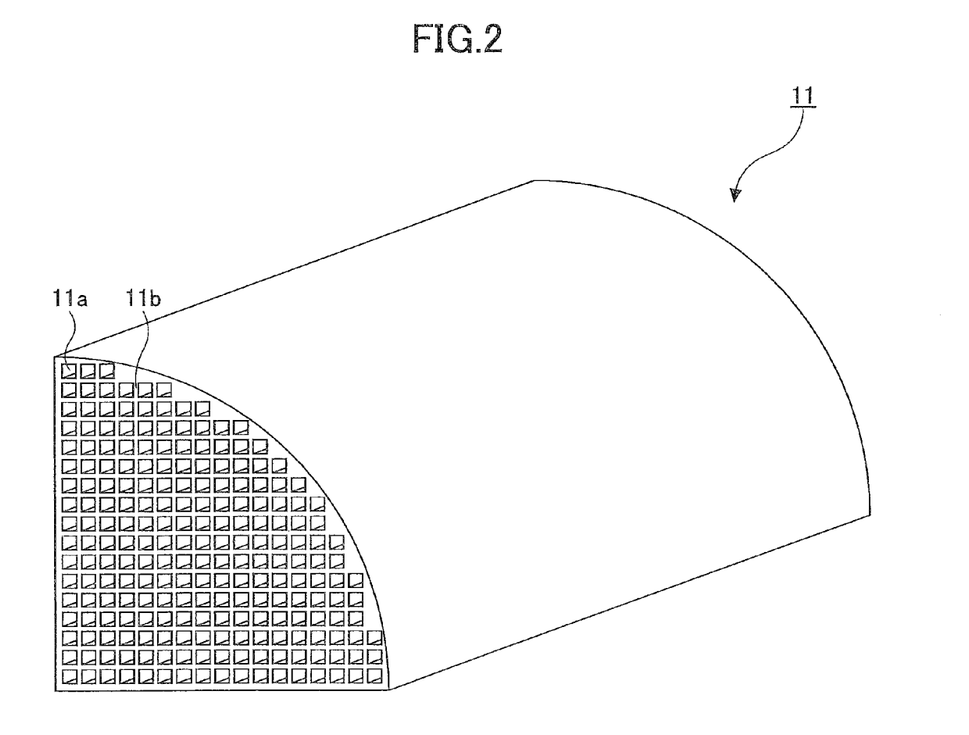
FIG. 2 is a perspective view illustrating an example of a honeycomb unit of the honeycomb structural body of FIG. 1.

FIG. 1 illustrates an example of a honeycomb structural body according to an embodiment of the present invention. The honeycomb structural body 10 is substantially circular-pillar shape. The honeycomb structural body 10 includes four honeycomb units 11 adhered to each other by interposing an adhesive layer 12. Each honeycomb unit 11 includes plural substantially square pillar-shaped through-holes 11a partitioned by cell walls 11b and arranged in a longitudinal direction of the honeycomb unit 11 (see FIG. 2). The cross section of the honeycomb unit, being perpendicular to the longitudinal direction of the honeycomb unit 11, has a substantially fan-like shape having a central angle of approximately 90 degrees. The honeycomb unit 11 includes a conductive ceramic material. Further, first and second belt-like electrodes 13 are formed on the entire outer periphery of both end portions of each honeycomb unit 11 relative to the longitudinal direction of the honeycomb unit 11.

It is to be noted that, in the specification and claims of the present application, the end portion of the honeycomb unit 11 includes the vicinity of the end portion of the honeycomb unit 11. Further, the vicinity of the end portion of the honeycomb unit 11 refers to a distance of approximately 30 mm or less from an end face of the honeycomb unit 11. Further, the outer periphery does not include the end face.

Annular conductive members 14 as first and second conductive members is provided in a manner electrically connected to four pairs of the belt-like electrodes 13. The annular shape of the conductive members is preferably a substantially circle-annular shape or a substantially elliptic-annular shape. The shape of the annular conductive members 14 of the honeycomb structural body 10 illustrated in FIG. 1 is a substantially circle-annular shape. Accordingly, in a case where voltage is applied from an automobile battery to the belt-like electrodes 13 via the annular conductive members 14, current can easily uniformly be distributed because substantially the same amount of voltage is applied to the four honeycomb units 11. Further, in a case where, for example, voltage is applied between the belt-like electrodes 13 from a high capacity battery used in, for example, a hybrid automobile, heating due to contact resistance can be easily prevented because owing to the satisfactory physical adherence between the annular conductive members 14 and the belt-like electrodes 13.

Although the conductive ceramic material of the honeycomb unit 11 is not to be limited in particular as long as the honeycomb unit can be sufficiently heated when predetermined current flows through the honeycomb unit 11, the conductive ceramic material may be, for example, a silicon carbide doped with aluminum nitride, aluminum, and the like.

It is preferable for the resistance between the belt-like electrodes 13 of the honeycomb unit 11 to range from approximately 1 Ω to approximately $1\times10^3$ Ω. In a case where the resistance between the belt-like electrodes 13 of the honeycomb unit 11 is equal to or more than approximately 1 Ω, the honeycomb unit 11 can be heated by distributing current through the honeycomb unit 11 according to Joule's law. On the other hand, in a case where the resistance between the belt-like electrodes 13 of the honeycomb unit 11 is equal to or less than approximately $1\times10^3$ Ω, the current flowing in the honeycomb unit 11 can easily become low even in a case where power is applied between the belt-like electrodes 13 from a high capacity battery used in, for example, a hybrid automobile via the annular conductive members 14. As a result, the honeycomb unit 11 can be sufficiently heated.

It is preferable for the honeycomb unit 11 to have a porosity ranging from approximately 25% to approximately 50%. In a case where the porosity of the honeycomb unit 11 equal to or more than approximately 25%, it becomes difficult for the thermal capacity of the honeycomb unit 11 to increase. Thereby, it becomes easy for generating heat in the honeycomb unit 11. In a case where the porosity of the honeycomb unit 11 is equal to or less than approximately 50%, it becomes difficult for the strength of the honeycomb unit 11 to become insufficient.

It is to be noted that the porosity of the honeycomb unit 11 can be measured by using a mercury penetration method.

It is preferable for the cross section perpendicular to the longitudinal direction of the honeycomb unit 11 to have an area ranging from approximately 5 $cm^2$ to approximately 50 $cm^2$. In a case where the cross section perpendicular to the longitudinal direction of the honeycomb unit 11 has an area equal to or more than approximately 5 $cm^2$, it becomes difficult for the pressure loss of the honeycomb structural body 10 to increase. On the other hand, in a case where the cross section perpendicular to the longitudinal direction of the honeycomb unit 11 has an area equal to or less than approximately 50 $cm^2$, it becomes difficult for cracks to occur even if thermal stress is generated in the honeycomb unit 11.

It is preferable for the cross-section perpendicular to the longitudinal direction of the honeycomb unit 11 to have an opening ratio ranging from approximately 50% to approximately 85%. In a case where the cross-section perpendicular to the longitudinal direction of the honeycomb unit 11 has an opening ratio equal to or more than approximately 50%, it becomes difficult for the heat capacity of the honeycomb unit 11 to increase. Thereby, it becomes easy to generate heat in the honeycomb unit 11. On the other hand, in a case where the cross-section perpendicular to the longitudinal direction of the honeycomb unit 11 has an opening ration equal to or less than approximately 85%, it becomes difficult for the strength of the honeycomb unit 11 to become insufficient.

It is preferable that the density of the through-holes of the cross section perpendicular to the longitudinal direction of the honeycomb unit 11 to range from approximately 15.5 to approximately 186 units per $cm^2$, more preferably approximately 31 to approximately 155 units per $cm^2$, and still more preferably approximately 46.5 to approximately 124 units per $cm^2$. In a case where the density of the through-holes of the cross section perpendicular to the longitudinal direction of the honeycomb unit 11 is equal to or more than approximately 15.5 units per $cm^2$, it becomes easy for exhaust gas and catalyst to contact where the catalyst is carried on the cell walls 11b. As a result, it becomes difficult for the conversion rate of the exhaust gas to decrease. On the other hand, in a case where the density of the through-holes of the cross section perpendicular to the longitudinal direction of the honeycomb unit 11 is equal to or less than approximately 186 units per $cm^2$, it becomes difficult for the pressure loss of the honeycomb structural body 10 to increase.

It is preferable for the cell walls 11b of the honeycomb unit 11 to have a thickness ranging from approximately 0.05 mm to approximately 0.30 mm. In a case where the thickness of the cell walls 11b is equal to or more than approximately 0.05 mm, it becomes difficult for the strength of the honeycomb unit 11 to decrease. On the other hand, in a case where the thickness of the cell walls 11b is equal to or less than approximately 0.30 mm, it becomes difficult for the thermal capacity of the honeycomb unit 11 to increase. Thereby, it becomes easy to generate heat in the honeycomb unit 11.

A catalyst may be carried on the cell walls 11b of the honeycomb unit 11.

The catalyst carried on the cell walls 11b is not particularly limited in particular as long as exhaust gas can be converted. The catalyst may be, for example, platinum, rhodium, palladium and the like.

A catalyst carrying layer containing γ-alumina is formed on the surface of the cell'walls 11b. It is preferable for the catalyst to be carried on the catalyst carrying layer.

Although the method for manufacturing the honeycomb unit 11 formed of silicon carbide doped with aluminum nitride is not limited in particular, the method may be, for example, firing a molded body molded by using a raw material paste containing silicon carbide and aluminum nitride.

It is preferable for the content of the aluminum nitride in the raw material paste to range from approximately 0.1 mass % to approximately 30 mass %.

According to necessity, the raw material paste may further contain an organic binder, a dispersion medium, a molding auxiliary agent, or the like.

Although the organic binder is not limited in particular, the organic binder may include methyl cellulose, carboxymethyl cellulose, hydroxyethyl cellulose, polyethylene glycol, phenol resin, epoxy resin, or the like. The organic binder may include two or more of the methyl cellulose, carboxymethyl cellulose, hydroxyethyl cellulose, polyethylene glycol, phenol resin, epoxy resin, or the like.

The content of the organic binder in the raw material paste is preferably approximately 1 mass % to approximately 10 mass % with respect to silicon carbide.

Although the dispersion medium included in the raw material paste is not limited in particular, the dispersion medium may include water, an organic solvent (such as benzene), and alcohol (such as methanol), or the like. The dispersion medium may include two or more of water, an organic solvent (such as benzene), and alcohol (such as methanol), or the like.

Although the molding auxiliary agent included in the raw material paste is not limited in particular, the molding auxiliary agent may include ethylene glycol, dextrin, fatty acid, fatty acid soap, polyalcohol, or the like.

Although the method for preparing the raw material paste is not limited in particular, the raw material paste may be mixed through a mixer, an attritor, and the like or kneaded through a kneader and the like.

Although the method for molding the raw material paste is not limited in particular, the raw material paste may be subject to extrusion molding or the like.

Although a drying apparatus for drying the molded body is not limited in particular, the drying apparatus may be a microwave drying apparatus, a hot-air drying apparatus, a dielectric drying apparatus, a pressure-reduction drying apparatus, a vacuum drying apparatus, a freeze drying apparatus, or the like. The dried molded body is preferably degreased, for example, at approximately 400° C. for approximately two hours.

The degreased molded body is preferably fired, for example, at approximately 2200° C. for approximately three hours in an inert gas (e.g., argon) atmosphere.

It is to be noted that nitrogen may be added during the firing process, so that silicon carbide can be doped with the nitrogen.

Instead of using the above-described honeycomb unit 11, an alternative honeycomb unit having conductive material provided inside the pores of the base material (aggregate) of the alternative honeycomb unit may be used.

Although the base material of the honeycomb unit is not limited in particular, the base material of the honeycomb unit 11 may be, for example, silicon carbide, aluminum titanate, cordierite, alumina, silica, zirconia, zeolite and the like.

Although the method for manufacturing the base material of the honeycomb unit 11 formed of silicon carbide is not limited in particular, the method for manufacturing the base material of the honeycomb unit 11 may be, for example, a method using a raw material that does not contain aluminum nitride.

It is preferable for the pores of the base material of the honeycomb unit 11 to include conductive material.

Although the conductive material provided inside the pores of the base material of the honeycomb unit 11 is not limited in particular as long as the conductive material can be sufficiently generated heat when applied with power, the conductive material may be, for example, silicon, or silicide such as nickel silicide, chrome silicide, iron silicide, or the like.

Although the method for forming a conductive layer including silicon is not limited in particular, a method for forming the conductive layer including silicon may be, for example, a method that impregnates the surface of the base material of the honeycomb unit with a slurry containing a molten silicon, silicon, or a silicon precursor.

As long as the belt-like electrodes 13 can be electrically connected to the annular conductive members 14, the shape of the cross section perpendicular to the longitudinal direction of the honeycomb unit 11 is not limited to a substantially fan-like shape.

Instead of using the above-described substantially square-pillar shaped through-holes 11a, the shape of the through-holes 11a may be, for example, a substantially triangular pillar, a substantially hexagonal pillar and the like.

It is preferable for the adhesive layer 12 to have a thickness ranging from approximately 0.5 mm to approximately 2 mm. In a case where the thickness of the adhesive layer 12 is equal to or more than approximately 0.5 mm, it becomes difficult for adhesive strength between the honeycomb units 11 to be insufficient. In a case where the thickness of the adhesive layer 12 is equal to or less than approximately 2 mm, it becomes difficult for the pressure loss of the honeycomb structural body 10 to increase.

Although the method for adhering the honeycomb units 11 is not limited in particular, the method may be, for example, applying an adhesive-layer paste on the honeycomb unit 11 and then solidifying the applied adhesive-layer paste by drying.

Although the adhesive-layer paste is not limited in particular, the adhesive-layer paste may be, for example, a mixture of an inorganic binder and inorganic particles, a mixture of an inorganic binder and inorganic fibers, a mixture of an inorganic binder, inorganic particles, and inorganic fibers, or the like.

Although the inorganic fibers contained in the adhesive-layer paste is not limited in particular, the material of the inorganic fibers may be, for example, alumina, silica, silicon carbide, silica alumina, glass, potassium titanate, aluminum borate, and the like. These materials may be used singularly or used in combination. Among these materials, silica alumina is preferable.

Although the inorganic binder contained in the adhesive-layer paste is not limited in particular, the material of the inorganic binder may be, for example, an inorganic sol (e.g., alumina sol, silica sol, titania sol), a clay binder (e.g., white earth, kaolin, montmorillonite, sepiolite, attapulgite), and the like. These materials may be used singularly or used in combination. Among these materials, alumina sol, silica sol, and titania sol is preferable.

Although the inorganic particles contained in the adhesive-layer paste are not limited in particular, the material of the inorganic particles, may be, for example, silicon carbide, alumina, silica, titania, zirconia, ceria, mullite, and the like. These materials may be used singularly or used in combination. Among these materials, silicon carbide is preferable.

Further, the adhesive-layer paste may contain an organic binder.

Although the organic binder contained in the adhesive-layer paste is not limited in particular, the material of the organic binder may be, for example, polyvinyl alcohol, methyl cellulose, ethyl cellulose, carboxylmethyl cellulose, and the like. These materials may be used singularly or used in combination.

It is to be noted that, instead of manufacturing the above-described honeycomb structural body 10 having a substantially circular-pillar shape, a honeycomb structural body 10 having a substantially rectangular-pillar shape, a substantially elliptical pillar shape and the like may be manufactured. In other words, the honeycomb structural body 10 has the shape of a substantially straight cylinder or a substantially elliptical cylinder, i.e. a substantially straight cylinder having a substantially elliptical shape as a base. In this case, the substantially elliptical-pillar shape of the cross-section (perpendicular to the longitudinal direction of the honeycomb unit 11) of the honeycomb unit 11 of the honeycomb structural body 10 is a substantially elliptical fan-like shape. The honeycomb structural body 10 is preferably substantially circular-pillar shape or substantially elliptical-pillar shape.

In the specification and the claims of the present application, the substantially ellipse or the ellipse of the substantially elliptical fan-like shape includes a substantially track-like shape having two substantially semi-circle shapes formed by connecting two substantially equal length lines. In other words, two substantially semi-cylinder shapes are connected. The substantially fan-like shape can be described by a combination of plural parts of substantially cylinder shapes being connected with each other, each part having a part of a substantially circle shape or a substantially elliptical shape, for example, a half or a quarter of a substantially circle shape or a substantially elliptical shape as a base.

It is preferable that the belt-like electrode 13 to be formed of metal.

Although the method for forming the belt-like electrodes 13 is not limited in particular, the method may be, for example, spraying, sputtering or the like.

Instead of using the above-described belt-like electrodes 13 formed on the entire outer periphery of the honeycomb unit 11, the belt-like electrodes 13 may be formed on a portion of the outer periphery of the honeycomb unit 11. That is, a belt-like electrode 13 may be formed shorter than the outer periphery of the honeycomb unit 11. Further, instead of using the above-described belt-like electrodes 13 having a belt-like shape, the electrodes 13 may be formed having a wave-like shape or a zigzag shape.

The annular conductive members 14 function as terminals.

It is to be noted that, in the specification and the claims of the present application, the term "annular" includes not only a closed annular shape but also an open annular shape.

Although the material of the annular conductive member 14 is not limited in particular, the annular conductive member 14 may be formed of, for example, a metal such as stainless steel.

The maximum width of the annular conductive member 14 preferably ranges from approximately 3 mm to approximately 30 mm. In a case where the width of the annular conductive member 14 is equal to or more than approximately 3 mm, it becomes difficult for the current flowing in the annular conductive member 14 per volume unit to increase when voltage is applied from a high capacity battery mounted on a hybrid automobile to the belt-like electrodes 13 via the annular conductive members 14. Thereby, the annular conductive members 14 are easily damaged. In a case where the width of the annular conductive member 14 is more than 30 mm, the volume of the generated heat of the honeycomb unit 11 decreases when voltage is applied between the belt-like electrodes 13 via the annular conductive members 14. Thereby, the honeycomb structural body 10 can easily sufficiently convert exhaust gas.

The maximum width of the annular conductive member 14 refers to the maximum length of the annular conductive member 14 relative to the longitudinal direction of the annular conductive member 14.

It is preferable to form a conductance retaining portion 15 between the annular conductive member 14 and the belt-like electrode 13. This further easily prevents generation of heat due to contact resistance between the annular conductive member 14 and the belt-like electrode 13.

Although the material of the conductance retaining portion 15 is not limited in particular, the conductance retaining portion 15 may be formed of, for example, metal or silicide (such as nickel silicide, chrome silicide, iron silicide), or the like. These materials may be used singularly or used in combination. Among these materials, nickel silicide is preferable.

Figure 3:
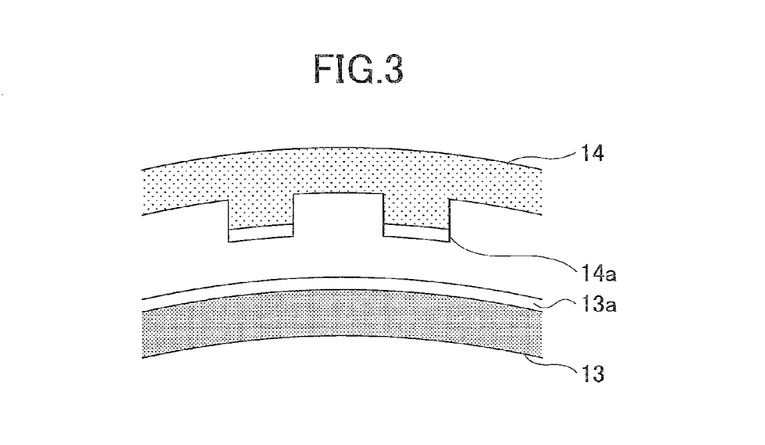
FIG. 3 is a cross-sectional view for describing an example of a method for forming a conductance retaining portion according to an embodiment of the present invention.
Figure 4:
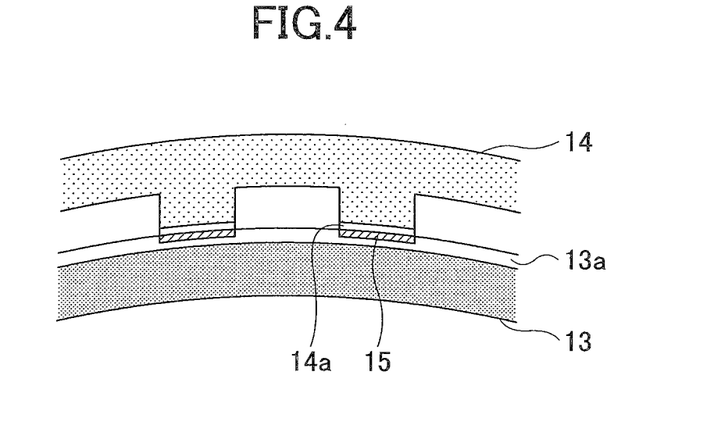
FIG. 4 is a cross-sectional view illustrating the conductance retaining portion formed by using the method of FIG. 3.

FIG. 3 is a cross-sectional view for describing an example of a method for forming the conductance retaining portion 15 according to an embodiment of the present invention. FIG. 4 is a cross-sectional view illustrating the conductance retaining portion 15 formed by the method of FIG. 3. The annular conductive member 14 has convex parts arranged at predetermined intervals on a surface facing the belt-like electrode 13. A nickel layer 14a is formed on an upper surface of each of the convex parts of the annular conductive member 14. On the other hand, a silicon layer 13a is formed on a surface of the belt-like electrode 13 formed on the outer peripheral surface of the honeycomb unit 11.

Then, by pressing the annular conductive member 14 against the belt-like electrode 13 in an inert gas atmosphere in a temperature ranging from approximately 800° C. to approximately 1000° C., the conductance retaining portion 15 made of nickel silicide can be formed between the convex part of the annular conductive member 14 and the belt-like electrode 13.

In a case where the annular conductive member 14 is pressed against the belt-like electrode 13 in an inert gas atmosphere in a temperature equal to or more than approximately 800° C., nickel and silicon can easily sufficiently react with each other. On other hand, a case where the annular conductive member 14 is pressed against the belt-like electrode 13 in an inert gas atmosphere in a temperature equal to or less than approximately 1000° C., it becomes difficult for the belt-like electrode 13 to melt.

Although the inert gas used in the atmosphere for pressing the annular conductive member 14 to the belt-like electrode 13 is not limited in particular, the inert gas may be, for example, helium, neon, argon, nitrogen, or the like.

The pressure applied from the annular conductive member 14 to the belt-like electrode 13 preferably ranges from approximately 0.3 MPa to approximately 3.0 MPa. In a case where the pressure applied from the annular conductive member 14 to the belt-like electrode 13 is equal to or more than approximately 0.3 MPa, generation of heat due to contact resistance easily occurs when voltage is applied from, for example, an automobile battery to the belt-like electrodes 13 via the annular conductive members 14. On the other hand, in a case where the pressure applied from the annular conductive member 14 to the belt-like electrode 13 is equal to or less than approximately 3.0 MPa, it becomes difficult for the honeycomb unit 11 to be damaged.

It is preferable for the ratio between an area of the surface of the annular conductive member 14 at which the convex part is formed and an area of the surface of the annular conductive member 14 at which the convex part is not formed to range from approximately ⅓ to approximately 1. In a case where the ratio between the areas is equal to or more than ⅓, it becomes difficult for the current flowing in the conductance retaining portion 15 to decrease. Thereby, it becomes difficult for generation of heat due to contact resistance to occur. On the other hand, in a case where the ratio between the areas is equal to or less than approximately 1, it becomes easy for the convex part to apply pressure to the belt-like electrode 13. Thereby, it becomes easy for the conductance retaining portion 15 made of nickel silicide to be sufficiently formed.

It is preferable for the ratio between the thickness of the surface of the annular conductive member 14 at which the convex part is formed and the thickness of the surface of the annular conductive member 14 at which the convex part is not formed to be approximately 5 or less. In a case where this ratio is approximately 5 or less, it becomes difficult for generation of heat due to contact resistance to occur when voltage is applied from, for example, an automobile battery to the belt-like electrodes 13 via the annular conductive members 14.

Although the method for forming a metal layer (for example, the nickel layer 14a) on the upper surface of the convex part of the annular conductive member 14 is not limited in particular, the method may be, for example, a plating method, a spraying method or the like.

It is to be noted that the nickel layer 14a, being formed on the upper surface of the convex part of the annular conductive member 14, may also be formed on a side surface of the convex part of the annular conductive member 14 or a surface of the annular conductive member 14 facing the belt-like electrode 13 on which the convex part is not formed.

Although the method for forming the silicon layer 13a on the surface of the belt-like electrode 13 is not limited in particular, the method may be for example, a method that impregnates the surface of the belt-like electrode 13 with a slurry containing a molten silicon, silicon, or a silicon precursor.

It is to be noted that, the above-described silicon layer 13a, being formed on the surface of the belt-like electrode 13, does not have to be formed on the entire surface of the belt-like electrode 13 as long as the silicon layer 13a is formed on a surface facing the nickel layer 14a of the annular conductive member 14.

Alternatively, it is preferable to form a metal conductance retaining portion as the conductance retaining portion 15 by providing a metal foil or a porous metal plate between the belt-like electrode 13 and the annular conductive member 14. In this case, only a portion of the metal foil or the porous metal plate is needed to contact the belt-like electrode 13 and the annular conductive member 14. In this case, the convex part may be formed on the surface of the annular conductive member 14 facing the belt-like electrode 13.

Further, it is preferable to form a metal conductance retaining portion as the conductance retaining portion 15 by forming a convex part or an apex-like part on the surface of the annular conductive member 14 facing the belt-like electrode 13 and pressing the convex part or the apex-like part against the belt-like electrode 13. In this case, the convex part or the apex-like part may be formed of a material substantially the same as or different from the material of the annular conductive member 14.

As described above, it is preferred that: the electrode has a layer containing silicon formed on at least a surface thereof; the conductive member has a surface facing the electrode on which a convex portion is formed; the convex portion includes a layer containing metal (such as nickel); and a silicide portion (such as nickel silicide) is formed between the electrode and the conductive member by a reaction between the silicon of the electrode and the metal (such as nickel) of the conductive member. Further, the electrode may have a layer containing metal (such as nickel) formed on at least a surface thereof; the conductive member may have a surface facing the electrode on which a convex portion is formed; the convex portion may include a layer containing silicon; and a silicide portion (such as nickel silicide) may be formed between the electrode and the conductive member by a reaction between the metal (such as nickel) of the electrode and the silicon of the conductive member.

The metal of the electrode or the conductive member is preferably nickel, chrome, iron, or the like, and more preferably nickel.

The silicide portion formed by a reaction between the metal of the electrode and the silicon of the conductive member is preferably nickel silicide, chrome silicide, iron silicide, or the like, and more preferably nickel silicide. It is to be noted that the metal contained in the electrode or the conductive member refers to metal except for silicon.

Figure 5:
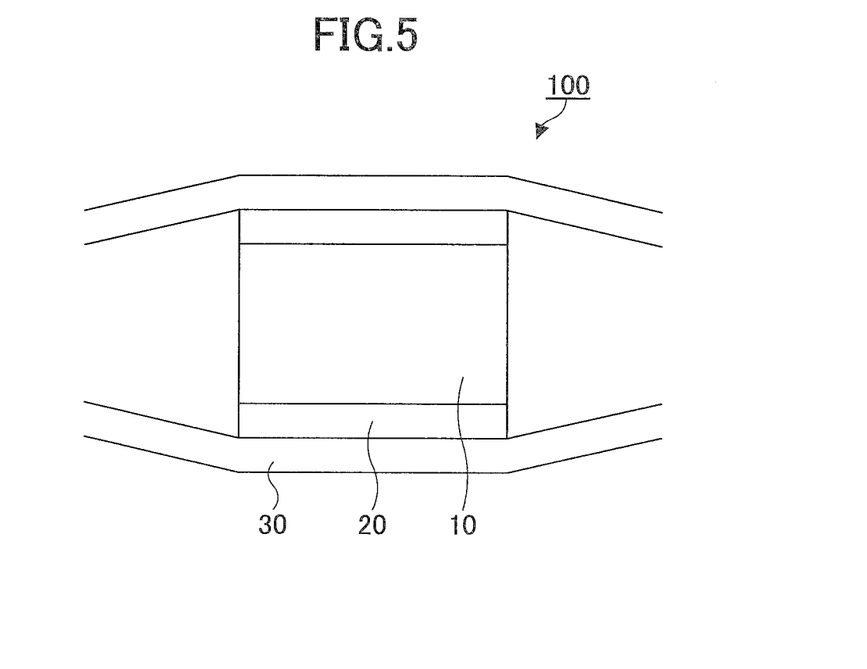
FIG. 5 is a cross-sectional view illustrating an example of an exhaust gas conversion apparatus according to an embodiment of the present invention.

FIG. 5 illustrates an example of an exhaust gas conversion apparatus 100 according to an embodiment of the present invention. The exhaust gas conversion apparatus 100 is obtained by canning the honeycomb structural body 10 to the metal pipe 30 in a state where the holding sealing member 20 is provided to the outer peripheral portion of the honeycomb structural body 10. An automobile battery (not illustrated) is connected to the annular conductive members 14 of the honeycomb structural body 10. Accordingly, it becomes easy for current to be uniformly distributed to the four honeycomb units when voltage is applied from, for example, an automobile battery to the belt-like electrodes 13 via the annular conductive members 14. As a result, exhaust gas conversion property of catalyst can be easily improved.

Obviously, numerous modifications and variations of the present invention are possible in light of the above teachings. It is therefore to be understood that within the scope of the appended claims, the invention may be practiced otherwise than as specifically described herein.

The invention claimed is:

1. A honeycomb structural body comprising:
a plurality of honeycomb units adhered to each other by interposing an adhesive layer, each of the plurality of honeycomb units containing a conductive ceramic material and comprising:
cell walls extending along a longitudinal direction of each of the plurality of honeycomb units to define a plurality of through-holes;
first and second electrodes provided on an outer peripheral surface of each of the plurality of honeycomb units; and
first and second conductive members electrically connected to the first and second electrodes, respectively.

2. The honeycomb structural body as claimed in claim 1, wherein each of the plurality of honeycomb units has a first end portion and a second end portion opposite to the first end portion in the longitudinal direction, and
wherein the first and second electrodes are provided at an outer periphery of each of the plurality of honeycomb units on the first end portion and the second end portion, respectively.

3. The honeycomb structural body as claimed in claim 1, wherein the plurality of honeycomb units adhered to each other by interposing the adhesive layer have a substantially circular-pillar shape or a substantially elliptical-pillar shape, and
wherein each of the first and second conductive members has a substantially circle-annular shape or a substantially elliptic-annular shape.

4. The honeycomb structural body as claimed in claim 3, wherein each of the first and second conductive members has a maximum width ranging from approximately 3 mm or more to approximately 30 mm or less.

5. The honeycomb structural body as claimed in claim 1, wherein a metal foil or a metal plate is interposed between the first and second electrodes and the first and second conductive members.

6. The honeycomb structural body as claimed in claim 1, wherein the first and second electrodes have surfaces on which layers containing silicon are formed,
wherein the first and second conductive members have surfaces which face the first and second electrodes, respectively, and on which convex portions are formed, respectively
wherein the convex portions include layers containing metal, and
wherein silicide portions are formed between the first and second electrodes and the first and second conductive members by a reaction between the silicon of the first and second electrodes and the metal of the first and second conductive members.

7. The honeycomb structural body as claimed in claim 6, wherein the metal of each of the first and second conductive members is nickel.

8. The honeycomb structural body as claimed in claim 6, wherein the metal of each of the first and second conductive members comprises nickel, chrome, or iron.

9. The honeycomb structural body as claimed in claim 6, wherein the silicide comprises nickel silicide, chrome silicide, or iron silicide.

10. The honeycomb structural body as claimed in claim 6, wherein the silicide is nickel silicide.

11. The honeycomb structural body as claimed in claim 1, wherein the first and second electrodes have a surfaces on which layers containing metal are formed,
wherein the first and second conductive members have surfaces which face the first and second electrodes, respectively, and on which convex portions are formed, respectively,
wherein the convex portions include layers containing silicon, and
wherein silicide portions are formed between the first and second electrodes and the first and second conductive members by a reaction between the metal of the first and second electrodes and the silicon of the first and second conductive members.

12. The honeycomb structural body as claimed in claim 11, wherein the metal of each of the first and second electrodes comprises nickel, chrome, or iron.

13. The honeycomb structural body as claimed in claim 11, wherein the metal of each of the first and second electrodes is nickel.

14. The honeycomb structural body as claimed in claim 11, wherein the silicide comprises nickel silicide, chrome silicide, or iron silicide.

15. The honeycomb structural body as claimed in claim 11, wherein the silicide is nickel silicide.

16. The honeycomb structural body as claimed in claim 1, wherein the first and second conductive members include convex parts or apex parts provided on surfaces facing the first and second electrodes, respectively, and
wherein the convex parts or the apex parts are configured to be pressed against the first and second electrodes.

17. The honeycomb structural body as claimed in claim 1, wherein the first and second electrodes are provided by spraying or sputtering.

18. The honeycomb structural body as claimed in claim 1, wherein the plurality of through-holes are partitioned by the cell walls, and
wherein a catalyst is carried on the cell walls.

19. The honeycomb structural body as claimed in claim 18, wherein the catalyst includes platinum, rhodium, or palladium.

20. The honeycomb structural body as claimed in claim 1, wherein the conductive ceramic material contains silicon carbide.

21. The honeycomb structural body as claimed in claim 20, wherein the silicon carbide is doped with aluminum nitride or aluminum.

22. The honeycomb structural body as claimed in claim 21, wherein the resistance between the first and second electrodes ranges from approximately 1 $\Omega$ to approximately $1 \times 10^3$ $\Omega$.

23. The honeycomb structural body as claimed in claim 21, wherein each of the first and second electrodes comprises metal.

24. The honeycomb structural body as claimed in claim 1, wherein the honeycomb structural body includes four honeycomb units adhered to each other by interposing an adhesive layer, and
wherein a cross section of each of the four honeycomb units, being perpendicular to the longitudinal direction, has a central angle of approximately 90 degrees.

25. The honeycomb structural body as claimed in claim 1, wherein each of the plurality of honeycomb units has a porosity ranging from approximately 25% to approximately 50%.

26. The honeycomb structural body as claimed in claim 1, wherein a base material of each of the plurality of honeycomb units comprises silicon carbide, aluminum titanate, cordierite, alumina, silica, zirconia, or zeolite.

27. The honeycomb structural body as claimed in claim 1, wherein a base material of each of the plurality of honeycomb units has pores, and
wherein a conductive material is provided inside the pores of the base material.

28. The honeycomb structural body as claimed in claim 27, wherein the conductive material comprises silicon or silicide.

29. The honeycomb structural body as claimed in claim 28, wherein the silicide comprises nickel silicide, chrome silicide, or iron silicide.

30. The honeycomb structural body as claimed in claim 1, wherein each of the first and second conductive members has an annular shape.

31. The honeycomb structural body as claimed in claim 30, wherein a material of each of the first and second conductive members comprises stainless steel.

32. The honeycomb structural body as claimed in claim 30, wherein each of the first and second conductive members includes a surface having a convex part, and
wherein a ratio between a first area of the surface at which the convex part is formed and a second area of the surface of at which the convex part is not formed ranges from approximately 1/3 to approximately 1.

33. The honeycomb structural body as claimed in claim 30, wherein each of the first and second conductive members includes a surface having a convex part, and
wherein a ratio between a first thickness of a first area of the surface at which the convex part is formed and a second thickness of a second area of the surface at which the convex part is not formed is approximately 5 or less.

34. An exhaust gas conversion apparatus comprising:
the honeycomb structural body as claimed in claim 1.

35. The exhaust gas conversion apparatus as claimed in claim 34,
wherein each of the plurality of honeycomb units has a first end portion and a second end portion opposite to the first end portion in the longitudinal direction, and
wherein the first and second electrodes are provided at an outer periphery of each of the plurality of honeycomb units on the first end portion and the second end portion, respectively.

36. The exhaust gas conversion apparatus as claimed in claim 34,
wherein the plurality of honeycomb units adhered to each other by interposing the adhesive layer have a substantially circular-pillar shape or a substantially elliptical-pillar shape, and
wherein each of the first and second conductive members has a substantially circle-annular shape or a substantially elliptic-annular shape.

37. The exhaust gas conversion apparatus as claimed in claim 34,
wherein each of the first and second conductive members has a maximum width ranging from approximately 3 mm or more to approximately 30 mm or less.

38. The exhaust gas conversion apparatus as claimed in claim 34,
wherein a metal foil or a metal plate is interposed between the first and second electrodes and the first and second conductive members.

39. The exhaust gas conversion apparatus as claimed in claim 34,
wherein the first and second electrodes have surfaces on which layers containing silicon are formed,
wherein the first and second conductive members have surfaces which face the first and second electrodes, respectively, and on which convex portions are formed, respectively,
wherein the convex portions include layers containing metal, and
wherein silicide portions are formed between the first and second electrodes and the first and second conductive members by a reaction between the silicon of the first and second electrodes and the metal of the first and second conductive members.

40. The exhaust gas conversion apparatus as claimed in claim 39,
wherein the metal of each of the first and second conductive members is nickel.

41. The exhaust gas conversion apparatus as claimed in claim 39,
wherein the metal of each of the first and second conductive members comprises nickel, chrome, or iron.

42. The exhaust gas conversion apparatus as claimed in claim 39,
wherein the silicide comprises nickel silicide, chrome silicide, or iron silicide.

43. The exhaust gas conversion apparatus as claimed in claim 39,
wherein the silicide is nickel silicide.

44. The exhaust gas conversion apparatus as claimed in claim 34,
wherein the first and second electrodes have a surfaces on which layers containing metal are formed,
wherein the first and second conductive members have surfaces which face the first and second electrodes, respectively, and on which convex portions are formed, respectively,
wherein the convex portions include layers containing silicon, and
wherein silicide portions are formed between the first and second electrodes and the first and second conductive members by a reaction between the metal of the first and second electrodes and the silicon of the first and second conductive members.

45. The exhaust gas conversion apparatus as claimed in claim 44,
wherein the metal of each of the first and second electrodes comprises nickel, chrome, or iron.

46. The exhaust gas conversion apparatus as claimed in claim 44,
wherein the metal of each of the first and second electrodes is nickel.

47. The exhaust gas conversion apparatus as claimed in claim 44,
wherein the silicide comprises nickel silicide, chrome silicide, or iron silicide.

48. The exhaust gas conversion apparatus as claimed in claim 44,
wherein the silicide is nickel silicide.

49. The exhaust gas conversion apparatus as claimed in claim 34,
wherein the first and second conductive members include convex parts or apex parts provided on surfaces facing the first and second electrodes, respectively, and
wherein the convex parts or the apex parts are configured to be pressed against the first and second electrodes.

50. The exhaust gas conversion apparatus as claimed in claim 34,
wherein the first and second electrodes are provided by spraying or sputtering.

51. The exhaust gas conversion apparatus as claimed in claim 34,
wherein the plurality of through-holes are partitioned by the cell walls, and
wherein a catalyst is carried on the cell walls.

52. The exhaust gas conversion apparatus as claimed in claim 51,
wherein the catalyst includes platinum, rhodium, or palladium.

53. The exhaust gas conversion apparatus as claimed in claim 34,
wherein the conductive ceramic material contains silicon carbide.

54. The exhaust gas conversion apparatus as claimed in claim 53,
wherein the silicon carbide is doped with aluminum nitride or aluminum.

55. The exhaust gas conversion apparatus as claimed in claim 54,
wherein the resistance between the first and second electrodes ranges from approximately 1 $\Omega$ to approximately $1 \times 10^3$ $\Omega$.

56. The exhaust gas conversion apparatus as claimed in claim 54,
wherein each of the first and second electrodes comprises metal.

57. The exhaust gas conversion apparatus as claimed in claim 34,
- wherein the honeycomb structural body includes four honeycomb units adhered to each other by interposing an adhesive layer, and
- wherein a cross section of each of the four honeycomb units, being perpendicular to the longitudinal direction, has a central angle of approximately 90 degrees.

58. The exhaust gas conversion apparatus as claimed in claim 34,
- wherein each of the plurality of honeycomb units has a porosity ranging from approximately 25% to approximately 50%.

59. The exhaust gas conversion apparatus as claimed in claim 34,
- wherein a base material of each of the plurality of honeycomb units comprises silicon carbide, aluminum titanate, cordierite, alumina, silica, zirconia, or zeolite.

60. The exhaust gas conversion apparatus as claimed in claim 34,
- wherein a base material of each of the plurality of honeycomb units has pores, and
- wherein a conductive material is provided inside the pores of the base material.

61. The exhaust gas conversion apparatus as claimed in claim 60,
- wherein the conductive material comprises silicon or silicide.

62. The exhaust gas conversion apparatus as claimed in claim 61,
- wherein the silicide comprises nickel silicide, chrome silicide, or iron silicide.

63. The exhaust gas conversion apparatus as claimed in claim 34,
- wherein each of the first and second conductive members has an annular shape.

64. The exhaust gas conversion apparatus as claimed in claim 63,
- wherein a material of each of the first and second conductive members comprises stainless steel.

65. The exhaust gas conversion apparatus as claimed in claim 63,
- wherein each of the first and second conductive members includes a surface having a convex part, and
- wherein a ratio between a first area of the surface at which the convex part is formed and a second area of the surface at which the convex part is not formed ranges from approximately $1/3$ to approximately 1.

66. The exhaust gas conversion apparatus as claimed in claim 63,
- wherein each of the first and second conductive members includes a surface having a convex part, and
- wherein a ratio between a first thickness of a first area of the surface at which the convex part is formed and a second thickness of a second area of the surface at which the convex part is not formed is approximately 5 or less.

* * * * *